United States Patent
Yang et al.

(10) Patent No.: US 11,625,043 B2
(45) Date of Patent: Apr. 11, 2023

(54) ROBOT CLEANER AND METHOD FOR CONTROLLING THE SAME

(71) Applicant: LG ELECTRONICS INC., Seoul (KR)

(72) Inventors: Wonkeun Yang, Seoul (KR); Junghwan Kim, Seoul (KR); Minho Lee, Seoul (KR); Jeongwoo Ju, Seoul (KR); Dongki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

(21) Appl. No.: 16/926,260

(22) Filed: Jul. 10, 2020

(65) Prior Publication Data

US 2021/0026367 A1 Jan. 28, 2021

(30) Foreign Application Priority Data

Jul. 25, 2019 (KR) .................. 10-2019-0090074

(51) Int. Cl.
*G05D 1/02* (2020.01)
*A47L 11/40* (2006.01)

(52) U.S. Cl.
CPC ........ *G05D 1/0238* (2013.01); *A47L 11/4061* (2013.01); *G05D 1/0221* (2013.01); *A47L 2201/04* (2013.01); *G05D 2201/0203* (2013.01)

(58) Field of Classification Search
CPC ............... G05D 1/0238; G05D 1/0221; G05D 2201/0203; G05D 1/0227; G05D 1/0242; G05D 1/0253; G05D 1/0274; G05D 2201/0215; A47L 11/4061; A47L 2201/04; A47L 9/009; A47L 9/2826; A47L 9/2852; A47L 9/2889; A47L 11/4011;

(Continued)

(56) References Cited

U.S. PATENT DOCUMENTS

| 6,810,305 B2 * | 10/2004 | Kirkpatrick, Jr. ....... A47L 9/009 701/25 |
| 2009/0281661 A1 * | 11/2009 | Dooley ............... B60L 15/2036 901/1 |

(Continued)

FOREIGN PATENT DOCUMENTS

| CN | 103654619 | 3/2014 |
| CN | 106821157 | 6/2017 |

(Continued)

OTHER PUBLICATIONS

Korean Office Action dated Nov. 23, 2020 issued in KR Application No. 10-2019-0090074.

(Continued)

*Primary Examiner* — Bao Long T Nguyen
(74) *Attorney, Agent, or Firm* — Ked & Associates, LLP

(57) ABSTRACT

The present disclosure provides a method for controlling a robot cleaner including a travel operation in which the robot cleaner travels, a recognition operation in which when the robot cleaner contacts an obstacle during the travel, the robot cleaner determines whether the obstacle is pushed by the robot cleaner and slides, and an obstacle bypass operation in which upon determination that the obstacle is the pushed-and-sliding obstacle, the robot cleaner stops the travel and then bypasses the pushed-and-sliding obstacle.

3 Claims, 5 Drawing Sheets

(58) Field of Classification Search
CPC ..... A47L 9/2831; B25J 9/1666; B25J 9/1676; B25J 11/0085; B25J 19/021
See application file for complete search history.

(56) References Cited

U.S. PATENT DOCUMENTS

| | | | |
|---|---|---|---|
| 2013/0098402 A1* | 4/2013 | Yoon | A47L 11/4011 15/3 |
| 2013/0206177 A1 | 8/2013 | Burlutskiy | |
| 2014/0075689 A1 | 3/2014 | Windorfer | |
| 2018/0000306 A1* | 1/2018 | Caruso | G05D 1/0242 |
| 2018/0035860 A1 | 2/2018 | Tsuboi et al. | |
| 2019/0038107 A1 | 2/2019 | Jang et al. | |
| 2019/0061156 A1* | 2/2019 | Li | A47L 1/00 |
| 2019/0086921 A1 | 3/2019 | Xia et al. | |
| 2019/0320866 A1* | 10/2019 | Thorne | A47L 5/24 |
| 2019/0320867 A1 | 10/2019 | Noh et al. | |

FOREIGN PATENT DOCUMENTS

| | | |
|---|---|---|
| JP | 2019-017952 | 2/2019 |
| KR | 10-2006-0062607 | 6/2006 |
| KR | 10-2016-0122520 | 10/2016 |
| KR | 10-2018-0058511 | 6/2018 |
| KR | 10-1984214 | 5/2019 |
| TW | 201909826 | 3/2019 |
| WO | WO 2019/033604 | 2/2019 |

OTHER PUBLICATIONS

International Search Report and Written Opinion dated Dec. 4, 2020 issued in International Application No. PCT/KR2020/007367.
Taiwanese Office Action (with English translation) dated Dec. 23, 2020 issued in TW Application No. 109121691.
T. Yoshikawa et al., Identification of the Center of Friction from Pushing an Object by a Mobile Robot, Proceedings IROS '91: IEEE/RSJ International Workshop on Intelligent Robots and Systems '91, Nov. 3-5, 1991, Osaka, Japan, pp. 449-454.
PC Chen et al., Practical Path Planning among Movable Obstacles, Proceedings of the 1991 IEEE International Conference on Robotics and Automation, Sacramento, California, Apr. 1991, pp. 444-449.
The partial supplementary European Search Report dated Jan. 16, 2023 issued in Application No. 20843925.7.

* cited by examiner

ROBOT CLEANER AND METHOD FOR CONTROLLING THE SAME

CROSS-REFERENCE TO RELATED APPLICATION

This application claims priority under 35 U.S.C. § 119 to Korean Application No. 10-2019-0090074 filed on Jul. 25, 2019, whose entire disclosure is hereby incorporated by reference.

BACKGROUND

1. Field

The present disclosure relates to a robot cleaner and a method for controlling the same, and more particularly, to a robot cleaner that may operate by recognizing a pushed-and-sliding obstacle, and a method for controlling the same.

2. Background

In general, a robot cleaner includes a body having a suction apparatus and a dust collection vessel, and a cleaning nozzle that is connected to the body and performs cleaning in a state of being close to a face to be cleaned. As a method for recognizing an obstacle by the robot cleaner, a method for recognizing a long distance obstacle using an ultrasonic sensor, an infrared sensor, a laser distance sensor (LDS), and the like, or a method for recognizing a front object using a camera is used. Sensors have different characteristics.

Korean Patent Application Publication No. 10-2006-0062607 discloses a technology for recognizing the obstacle using the sensor. In order for the robot cleaner to thoroughly clean all rooms, the cleaning must be performed while moving. When encountering a pushed-and-sliding and lower height obstacle (such as laundry rack, a foot mat, a foot towel, and the like), the robot cleaner is not able to distinguish the pushed-and-sliding and lower height obstacle from a pushed-but-fixed threshold of the room. Thus, the robot cleaner tends to pass such pushed-and-sliding obstacle. However, the obstacles such as the laundry rack and the mat are not fixed to a floor, so that the obstacles such as the laundry rack and the mat are pushed when being pushed by the cleaner. When being pushed by the cleaner, the laundry rack is often pushed to a wall and falls, and the foot mat/the foot towel, and the like are often dragged away from original places. Further, it may happen that the robot cleaner pushes the foot mat in front of a vestibule and then falls to the vestibule. In order to solve such problem, it is necessary for the robot cleaner to recognize the pushed-but-fixed obstacle such as the threshold of the room and the pushed-and-sliding obstacle that may be pushed and moved during travel in a manner of distinguishing the pushed-but-fixed obstacle and the pushed-and-sliding obstacle from each other.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
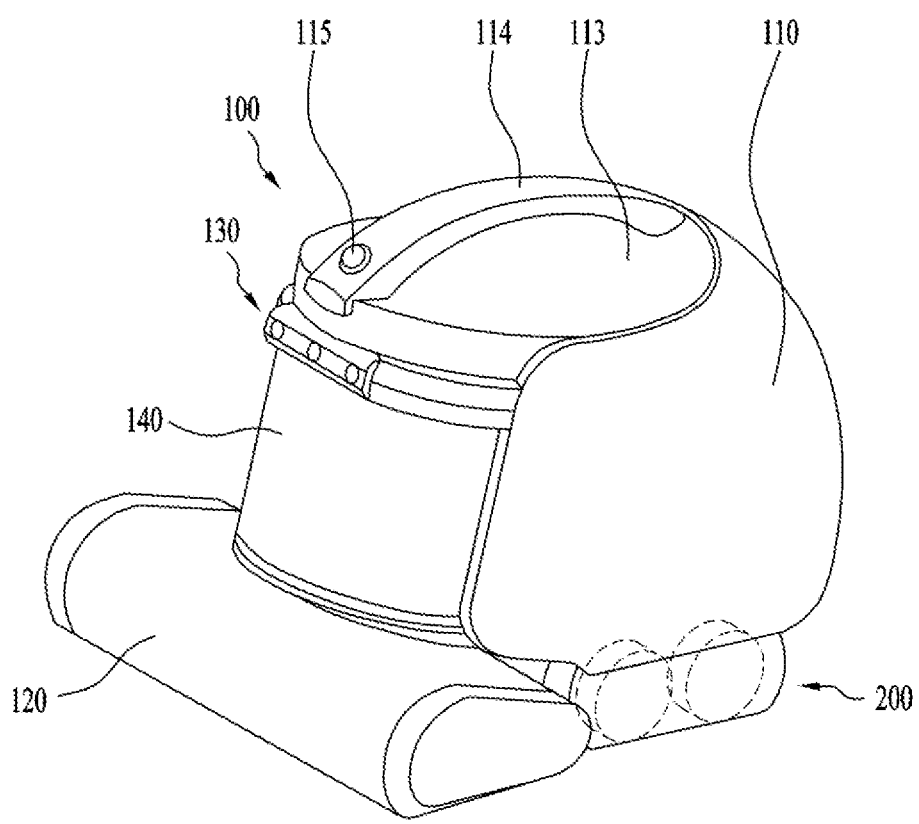
FIG. 1 is a perspective view illustrating a cleaner according to an embodiment of the present disclosure.

Hereinafter, a preferred embodiment according to the present disclosure that may specifically realize the above object will be described with reference to the accompanying drawings. In such process, a size or a shape of a component shown in the drawings may be exaggerated for clarity and convenience of description. Moreover, terms specifically defined in consideration of the composition and operation according to the present disclosure may vary depending on the intention or custom of the user or operator. Definitions of such terms should be made based on the contents throughout this specification.

FIG. 1 is a perspective view illustrating a cleaner according to an embodiment of the present disclosure. Referring to FIG. 1, a cleaner 100 includes a body 110, a cleaning nozzle 120, a sensing unit 130, and a dust collection vessel 140.

Various parts including a controller (not shown) for controlling the cleaner 100 are embedded or mounted in the body 110. The body 110 may define therein a space in which the various parts constituting the cleaner 100 are accommodated. The body 110 is equipped with a wheel unit 200 for moving the body 110. The wheel unit 200 may include a motor (for example, wheel motor 400 in FIG. 2) and at least one wheel rotated by a driving force of the motor. A direction of rotation of the motor may be controlled by the controller (not shown). Accordingly, the wheel of the wheel unit 200 may be rotated clockwise or counterclockwise.

The wheel units 200 may be respectively arranged on both left and right sides of the body 110. The body 110 may be moved back and forth and left and right, or rotated by the wheel unit 200. The wheel units 200 may be driven independently of each other. To this end, the wheel units 200 may be respectively driven by different motors.

As the controller controls the driving of the wheel unit 200, the cleaner 100 autonomously moves on a floor. The wheel unit 200 is disposed at a lower portion of the body 110 and moves the body 110. The wheel unit 200 may be composed of circular wheels only, may be composed of circular rollers connected to each other by a belt chain, or may be composed of a combination of the circular wheels and the circular rollers connected to each other by the belt chain. An upper portion of the wheel of the wheel unit 200 may be disposed within the body 110, and a lower portion thereof may protrude downward from the body 110.

The wheel units 200 may be installed on the left and right sides of the body 110, respectively. The wheel unit 200 disposed on the left side of the body 110 and the wheel unit 200 disposed on the right side of the body 110 may be driven independently of each other. That is, the wheel unit 200 disposed on the left side of the body 110 may include at least one wheel that may be connected to each other through at least one gear and may be rotated by a driving force of a first wheel driving motor (or motor) that rotates the gear. Moreover, the wheel unit 200 disposed on the right side of the body 110 may include at least one wheel that may be connected to each other through at least one gear and may be rotated by a driving force of a second wheel driving motor that rotates the gear.

The controller may determine a travel direction of the body 110 by controlling a rotational velocity of each of the first wheel driving motor and the second wheel driving motor. For example, when the first wheel driving motor and the second wheel driving motor are simultaneously rotated at the same velocity, the body 110 may move straight. Moreover, when the first wheel driving motor and the second wheel driving motor are simultaneously rotated at different velocities, the body 110 may turn left or right. The controller may drive one of the first wheel driving motor and the second wheel driving motor and stop the other to turn the body 110 to the left or right. The body 110 is equipped with a battery (not shown) that supplies power to electrical components of the cleaner 100. The battery may be rechargeable and detachable from the body 110.

Air containing dust introduced through the cleaning nozzle 120 enters the dust collection vessel 140 through an inhale channel inside the body 110. The air and the dust are separated from each other while passing through at least one filter (e.g., a cyclone, a filter, and the like) in the dust collection vessel 140. The dust is collected in the dust collection vessel 140, and the air is exhausted from the dust collection vessel 140, then passes along an exhaust channel inside the body 110, and then finally exhausted through an exhaust port to the outside. An upper cover 113 for covering the dust collection vessel 140 accommodated in a dust collection vessel receiving portion 112 is disposed on the body 110. The upper cover 113 may be hinged to one side of the body 110 and pivotable. The upper cover 113 may cover a top of the dust collection vessel 140 by covering an open top of the dust collection vessel receiving portion 112. In addition, the upper cover 113 may be separable and detachable from the body 110. In a state in which the upper cover 113 is disposed to cover the dust collection vessel 140, the separation of the dust collection vessel 140 from the dust collection vessel receiving portion 112 may be restricted.

A handle 114 is disposed on a top of the upper cover 113. Imaging means 115 may be disposed on the handle 114. In this connection, the imaging means 115 is preferably disposed obliquely with respect to a bottom face of the body 110 to capture the front and the top together.

The imaging means 115 may be disposed on the body 110 and capture an image for simultaneous location and mapping (SLAM) of the cleaner. The image captured by the imaging means 115 is used to generate a map of a travel region or sense a current location within the travel region. The imaging means 115 may generate 3-dimensional coordinate information related to a periphery of the body 110. That is, the imaging means 115 may be a 3-dimensional depth camera (3D depth camera) that calculates a perspective distance between the cleaner 100 and an imaging target. Accordingly, field data for the 3-dimensional coordinate information may be generated.

Specifically, the imaging means 115 may capture a 2-dimensional image related to the periphery of the body 110. A plurality of 3-dimensional coordinate information corresponding to the captured 2D image may be generated. In one embodiment, the imaging means 115 may be formed in a stereo vision scheme in which at least two cameras that acquire the existing 2-dimensional images are arranged and at least two images respectively acquired from the at least two cameras are combined with each other to generate the 3-dimensional coordinate information.

The imaging means 115 may include a first pattern irradiating unit that irradiates light of a first pattern downward toward the front of the body, a second pattern irradiating unit that irradiates light of a second pattern upward toward the front of the body, and an image acquisition unit that acquires an image of the front of the body. Thus, the image acquisition unit may acquire an image of a region into which the light of the first pattern and the light of the second pattern are incident.

Further, the imaging means 115 is equipped with an infrared pattern emitter that irradiates an infrared pattern together with a single camera. A distance between the imaging means 115 and the imaging target may be measured by capturing a shape of the infrared pattern irradiated from the infrared pattern emitter projected onto the imaging target. The imaging means 115 may be an infrared (IR) imaging means 115.

In one example, the imaging means 115 is equipped with a light emitter that emits light together with the single camera. The imaging means 115 may receive a portion reflected from the imaging target of laser emitted from the light emitter and analyze the received laser to measure the distance between the imaging means 115 and the imaging target. Such imaging means 115 may be imaging means 115 of a time of flight (TOF) scheme.

The imaging means 115 as above is configured to irradiate laser extending in at least one direction. In one example, the imaging means 115 may include first and second lasers. The first laser may irradiate laser in a shape in which straight lines intersect each other, and the second laser may irradiate laser in a shape of a single straight line. Thus, the bottommost laser is used to sense an obstacle at a lower portion, the topmost laser is used to sense an obstacle at a upper portion, and middle laser between the bottommost laser and the topmost laser is used to sense an obstacle in a middle portion.

The sensing unit 130 may be disposed below the upper cover 113, and the sensing unit 130 may be detachably coupled to the dust collection vessel 140. The sensing unit 130 is disposed on the body 110 and senses information related to an environment where the body 110 is located. The sensing unit 130 senses information related to the environment to generate field data.

The sensing unit 130 senses a terrain feature (including the obstacle) such that the cleaner 100 does not collide with the obstacle. The sensing unit 130 may sense external information of the cleaner 100. The sensing unit 130 may sense a user around the cleaner 100. The sensing unit 130 may sense an object around the cleaner 100. In addition, the sensing unit 130 is configured to perform panning (moving in a left and right direction) and tilting (disposed obliquely in an up and down direction) to improve a sensing function of the cleaner and a travel function of the robot cleaner.

The sensing unit 130 may include at least one of an external signal sensor, an obstacle sensor, a cliff sensor, a lower camera sensor, an upper camera sensor, a current sensor, an encoder, an impact sensor, and a microphone. The external signal sensor may sense an external signal of the cleaner 100. The external signal sensor may be, for example, an infrared ray sensor, an ultrasonic sensor, a radio frequency sensor, and the like. Accordingly, field data for the external signal may be generated.

The cleaner 100 may sense information about a location and a direction of a charging device by receiving a guide signal generated by the charging device using the external signal sensor. In this connection, the charging device may transmit the guide signal indicating the direction and a distance such that the cleaner 100 is able to return. That is, the cleaner 100 may receive the signal transmitted from the charging device to determine the current location and set a moving direction to return to the charging device.

The obstacle sensor may sense a front obstacle. Accordingly, field data for the obstacle is generated. The obstacle sensor may sense an object existing in the moving direction of the cleaner 100 and transmit the generated field data to the controller. That is, the obstacle sensor may sense a protrusion, a fixture in the house, furniture, a wall face, a wall edge, and the like existing on a moving path of the cleaner 100 and transmit field data thereof to the controller. The obstacle sensor may be, for example, an infrared sensor, an ultrasonic sensor, an RF sensor, a geomagnetic sensor, and the like. The cleaner 100 may use one type of sensor or, when it is necessary, at least two types of sensors together as the obstacle sensor.

The cliff sensor (or second sensor) may sense an obstacle on the floor that supports the body 110 mainly using various types of light sensors. Accordingly, field data for the obstacle on the floor is generated. The cliff sensor may be an infrared sensor, an ultrasonic sensor, an RF sensor, a position sensitive detector (PSD) sensor, and the like equipped with a light emitter and a light receiver like the obstacle sensor.

For example, the cliff sensor may be the PSD sensor, but may be composed of a plurality of different types of sensors. The PSD sensor includes a light emitter that emits infrared light on the obstacle, and a light receiver that receives the infrared light reflected from the obstacle, and is generally formed in a module shape. When the obstacle is sensed using the PSD sensor, a stable measurement may be obtained regardless of a reflectance of the obstacle and a color difference. The controller may sense a cliff by measuring an infrared light angle between an emission signal of the infrared light emitted by the cliff sensor toward the ground and a reflection signal of the infrared light reflected by the obstacle and received, and may acquire field data of a depth of the cliff.

The cliff sensor may sense a material of the floor. The cliff sensor may sense a reflectance of light reflected from the floor, and the controller may determine the material of the floor based on the reflectance. For example, when the material of the floor is marble with good reflectance, the reflectance of the light sensed by the cliff sensor will be high. When the material of the floor is wood, a floor paper, a carpet, and the like whose reflectance is relatively poor compared to the marble, the reflectance of the light sensed by the cliff sensor will be relatively low. Therefore, the controller may determine the material of the floor using the reflectance of the floor sensed by the cliff sensor, and may determine the floor as the carpet when the reflectance of the floor is a set reflectance.

Moreover, the cliff sensor may sense a distance from the floor, and the controller may sense the material of the floor based on the distance from the floor. For example, when the cleaner is located on the carpet on the floor, the distance from the floor sensed by the cliff sensor will be sensed smaller than when the cleaner is located on the floor without the carpet. Therefore, the controller may determine the material of the floor using the distance from the floor sensed by the cliff sensor. When the distance from the floor is equal to or greater than a set distance, the floor may be determined as the carpet.

The lower camera sensor acquires image information (field data) about a face to be cleaned while the cleaner 100 is moving. The lower camera sensor may be referred to as an optical flow sensor. The lower camera sensor may generate an image data (field data) of a predetermined format by converting an image of a lower portion input from an image sensor disposed in the sensor. The field data about the image recognized through the lower camera sensor may be generated. Using the lower camera sensor, the controller may detect a position of a mobile robot regardless of sliding of the mobile robot. The controller may compare and analyze the image data captured by the lower camera sensor over time to calculate a moved distance and the moving direction, and calculate the position of the mobile robot based on the moved distance and the moving direction.

The lower camera sensor may capture the floor, and the controller may determine the material of the floor by analyzing the image captured by the lower camera sensor. Images corresponding to the material of the floor may be set in the controller. Further, when the set image is included in the images captured by the camera sensor, the controller may determine the material of the floor as a material corresponding to the set image. When the set image corresponding to an image of the carpet is included in the images, the material of the floor may be determined as the carpet.

The upper camera sensor may be installed to be directed upward or forward of the cleaner 100 to capture a region around the cleaner 100. When the cleaner 100 is equipped with a plurality of upper camera sensors, the camera sensors may be formed on a top or a side of the mobile robot at a certain distance or a certain angle. Field data about an image recognized through the upper camera sensor may be generated.

The current sensor (or first sensor) may sense a current resistance (or load) of the wheel driving motor, and the controller may determine the material of the floor based on the current resistance sensed by the current sensor. For example, when the cleaning nozzle 120 is placed on the carpet on the floor, a pile of the carpet may be sucked through an intake of the cleaning nozzle 120 and interrupt the travel of the cleaner. At this time, current resistance due to load will be generated between a rotor and a stator of the wheel driving motor. The current sensor may sense the current resistance generated from the wheel driving motor. In addition, the controller may determine the material of the floor based on the current resistance, and may determine the material of the floor as the carpet when the current resistance is equal to or greater than a preset value.

The encoder may sense information related to the operation of the motor operating the wheel of the wheel unit 200. Accordingly, field data about the operation of the motor is generated. The impact sensor may sense an impact generated when the cleaner 100 collides with an external obstacle and the like. Accordingly, field data about the external impact is generated. The microphone may sense external sound. Accordingly, field data about the external sound is generated.

Figure 2:
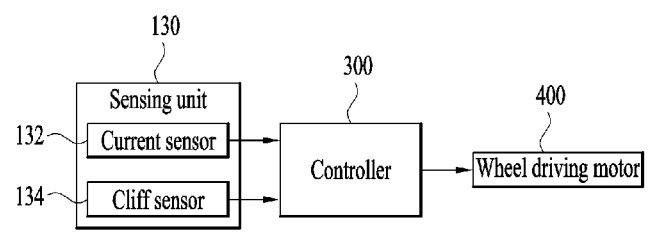
FIG. 2 is a control block diagram according to an embodiment.

FIG. 2 is a control block diagram according to an embodiment. Referring to FIG. 2, the sensing unit 130 includes a current sensor 132 and a cliff sensor 134. The current sensor 132 may sense a current resistance of the wheel driving motor 400. Further, the cliff sensor 134 may sense a height value with respect to a floor face on which the cleaner travels. Further, the cliff sensor 134 may sense a quantity of light reflected from the floor.

The controller 300 may collect the information collected from the sensing unit 130 to drive the wheel driving motor 400. That is, when determining that the robot cleaner is in contact with the obstacle during the travel, the controller 300 may drive the wheel driving motor 400 to keep pushing the obstacle or to bypass the obstacle. In particular, the controller 300 may drive the wheel driving motor 400 using information collected from the current sensor 132 and the cliff sensor 134.

The current sensor 132 and the cliff sensor 134 may respectively include current sensors respectively arranged on the left and right sides of the body 110 and cliff sensors respectively arranged on the left and right sides of the body 110. Further, the wheel driving motors are also respectively arranged on left and right wheels. That is, a current sensor disposed on the left side may sense a current resistance of the left wheel driving motor, and a current sensor disposed on the right side may sense a current resistance of the right wheel driving motor. A cliff sensor disposed on the left side may sense a height value of the floor face on the left side of the body, and a cliff sensor disposed on the right may sense a height value of the floor face on the right of the body. The controller 300 may drive the left wheel motor and the right wheel motor respectively based on information sensed from the left and right sides.

Figure 3:
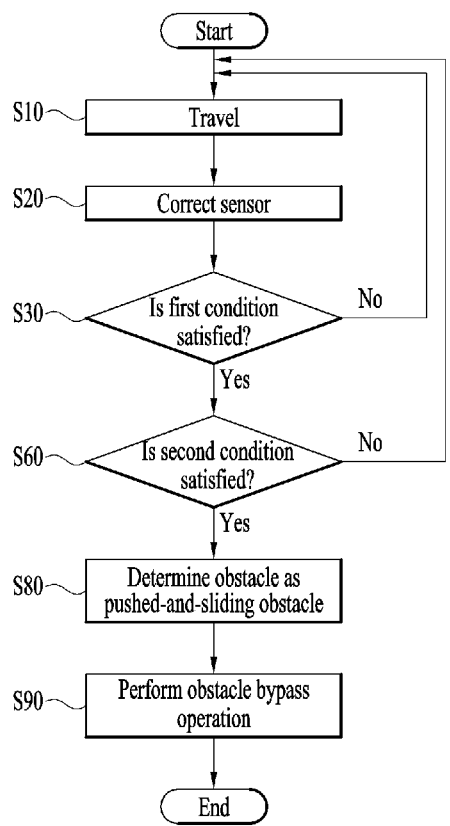
FIG. 3 is a control flow diagram according to an embodiment.
Figure 4:
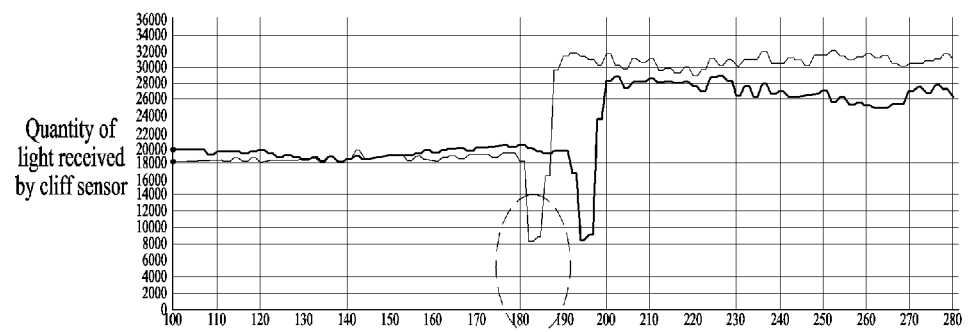
FIG. 4 illustrates a second condition in FIG. 3.
Figure 4:
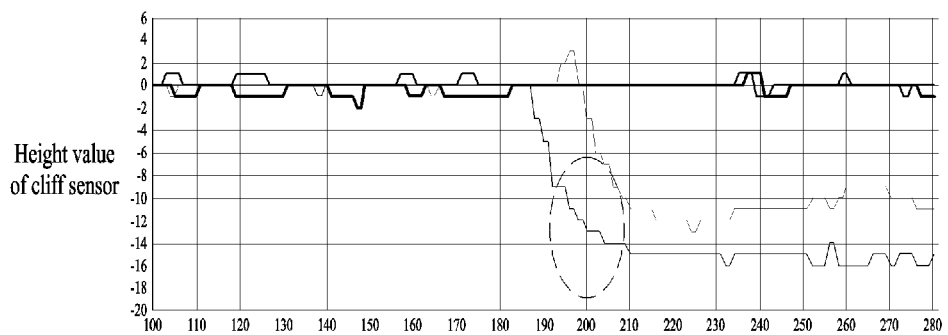
Figure 4:
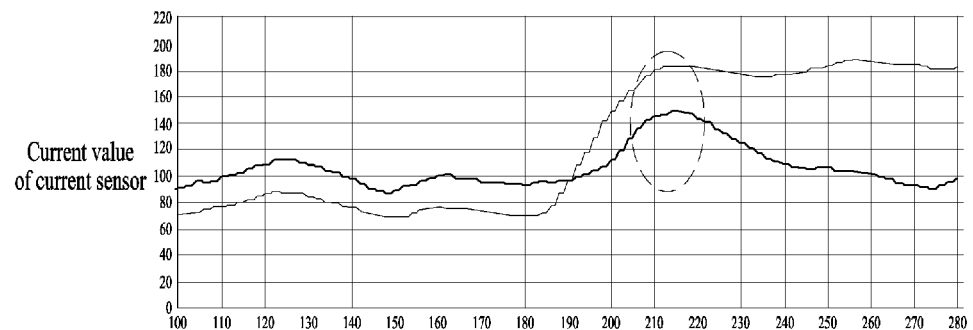

FIG. 3 is a control flow diagram according to an embodiment. In addition, FIG. 4 illustrates a second condition in FIG. 3. A description will be achieved with reference to FIGS. 3 and 4. An embodiment is roughly composed of a travel operation in which the robot cleaner travels, a recognition operation in which when the robot cleaner contacts the obstacle during the travel, the robot cleaner determines whether the obstacle is pushed by the robot cleaner and slides, and an obstacle bypass operation in which upon determination that the obstacle is the pushed-and-sliding obstacle, the robot cleaner stops the travel and then bypasses the pushed-and-sliding obstacle. In one embodiment, the robot cleaner is configured to perform a set operation when sensing the pushed-and-sliding obstacle during the travel.

A related content will be described in detail. The robot cleaner moves while cleaning the floor face, which means that the body 110 of the robot cleaner travels (S10). The floor is made of various types of materials such as the carpet, a floor board, and the like, and the floor changes as the robot cleaner moves. Moreover, as the robot cleaner moves over the obstacle such as a threshold while moving, the information acquired by the sensing unit 130 also changes.

Therefore, correction for the sensing unit 130 is performed while the robot cleaner moves (S20). For example, offset correction of the cliff sensor 134 based on a change in the floor material is possible. In this connection, processing of features for learning engine input such as pre-processing (a moving average, a difference, and the like) of a sensor value is possible.

Specifically, an initial correction of the initial cliff sensor 134 may be performed based on a position of the floor where the cleaning is started. When the robot cleaner moves to another place in the house made of a different floor material, a base line of the cliff sensor may change and offset may occur, which may cause false recognition. For example, when the robot cleaner moves from the floor board to a marble floor, an offset of a value measured by the cliff sensor equal to or greater than 5 mm may occur. In order to solve such problem, a floor condition may be periodically monitored, and an offset correction value may be used to prevent the misrecognition when it is determined that the floor material has been changed. When the correction of the sensed value of the sensing unit 130 is performed, a reliable measurement value may be secured by the sensing unit 130 even when the floor material changes.

Subsequently, the controller 300 determines whether a first condition is satisfied (S30). The determination about the first condition may be performed when the robot cleaner senses an unusual signal by the sensing unit during the travel. The first condition may mean a condition excluding a case in which the obstacle that is brought to be in contact with the robot cleaner during the travel is misrecognized as the pushed-and-sliding obstacle. The first condition may mean cases not corresponding to cases in which the robot cleaner is rotated, is lifted, travels on the carpet, is tilted, and the wall is sensed. In one example, the first condition may mean one of the cases described above.

In a case corresponding to the first condition, a change in the sensed values sensed by the sensing unit 130 occurs. However, in this case, it is determined that a situation other than that the robot cleaner encountered the pushed-and-sliding obstacle during the travel has occurred.

For example, when the robot cleaner is rotating, it may be determined that one of the left wheel and the right wheel has a negative velocity. When the robot cleaner is lifted, it may be determined that a y-axis angle of the gyro sensor is equal to or greater than a certain angle. When the robot cleaner travels on the carpet, it may be determined that a current value supplied to an agitator installed in the suction nozzle is excessive. When the robot cleaner is tilted, it may be recognized that an x-axis angle of the gyro sensor is equal to or greater than a certain angle. Further, when the robot cleaner senses the wall, and when the $3d$ sensor senses a height equal to or greater than a certain height, it may be determined that the robot cleaner has sensed the wall not the pushed-and-sliding obstacle.

In one embodiment, the case corresponding to the first condition is filtered out. Therefore, a case in which an error of recognizing the pushed-and-sliding obstacle even when the robot cleaner does not encounter the pushed-and-sliding obstacle during the travel and a different situation occurs may occur may be excluded.

The controller 300 determines whether a second condition is satisfied when the first condition is satisfied (S60). The determination about the second condition may be performed when the robot cleaner senses an unusual signal by the sensing unit during the travel. When being in contact with the pushed-and-sliding obstacle that is pushed by the movement of the robot cleaner during the travel, the robot cleaner moves with the obstacle. Therefore, a signal different from a previous signal may be sensed by the sensing unit 130.

As shown in FIG. 4, the second condition may include a case in which the current resistance of the wheel driving motor 400 recognized by the current sensor 132 changes. It may be seen that a change in the current resistance measured by the current sensor of rapidly increasing from a specific time-point (a time-point of being brought into contact with the pushed-and-sliding obstacle) has occurred. Moreover, the second condition may include a case in which the height value measured by the cliff sensor 134 changes. It may be seen that the height value measured by the cliff sensor changes rapidly from the specific time-point (the time-point of being brought into contact with the pushed-and-sliding obstacle). Moreover, the second condition may include a case in which a quantity of light received by the cliff sensor 134 changes. It may be seen that the quantity of the light measured by the cliff sensor changes rapidly from the specific time-point (the time-point of being brought into contact with the pushed-and-sliding obstacle).

In this connection, a variation range of the current resistance, a variation range of the height value measured by the cliff sensor, and a variation range of the quantity of the light may be set differently based on a manufacturer who manufactures the robot cleaner or the user who uses the robot cleaner. The controller may reduce the misrecognition that may occur in a normal travel situation through the second condition.

The second condition may refer to a condition that performs a trigger function. Because a wheel load may occur when the obstacle is pushed, the first condition may include a case in which a variation of the current value of the wheel driving motor is large. The second condition may include a case in which the change in the height value measured by the cliff sensor is equal to or greater than a certain value because a thin object does not affect a height of the front. A third condition may include a case in which a change in a quantity of the reflected light received by the cliff sensor is large because the object affects the quantity of light irradiated and received by the cliff sensor located in front. When one of the three conditions occurs for a certain period of time, it may be determined that a situation of being pushed has occurred (S80).

When one of the three conditions described above occurs even for one time, it may be determined that the robot cleaner has encountered the obstacle. Otherwise, when one of the three conditions occurs continuously, it may be determined that the robot cleaner has encountered the obstacle. Further, when at least two of the three conditions occur consecutively, it may be determined that the robot cleaner has encountered the obstacle.

In one example, when one of the three conditions is satisfied, and when data in which the current resistance of the wheel driving motor recognized by the current sensor, the height value measured by the cliff sensor, and the light quantity received by the cliff sensor is processed satisfy conditions in which the obstacle is determined to be the pushed-and-sliding obstacle, it may be determined that the robot cleaner has been in contact with the pushed-and-sliding obstacle. That is, in this case, as long as the second condition is satisfied, whether the robot cleaner has been in contact with the pushed-and-sliding obstacle may be determined using the information received from the sensing unit.

In this connection, the controller 300 may determine whether the robot cleaner has been in contact with the pushed-and-sliding obstacle by processing data using a machine learning or artificial intelligence technique. In this connection, a DNN model structure used may be implemented as follows.

As input values, a left wheel velocity, a right wheel velocity, a left wheel current, a right wheel current, a height value and a light quantity of the cliff sensor installed on the front left side, and a height value and a variation thereof, and a variation of a light quantity of the cliff sensor installed on the front right side may be sampled 30 times. Accordingly, output values may be distinguished by identifying a type of the pushed-and-sliding obstacle. For example, compared to results of previous experiments on the pushed-and-sliding obstacles such as a laundry rack, a mat, and the like, the controller may determine which type of pushed-and-sliding obstacle the robot cleaner has been in contact with.

In other words, when classifying the obstacles, various information may be extracted using the cliff sensor, the current sensor, and a velocity sensor of the wheel, and the like, then data is accumulated for 300 ms and input to the DNN, and then which pushed-and-sliding obstacle the robot cleaner is in contact with may be determined among the types of the pushed-and-sliding obstacle. When it is determined that the robot cleaner is pushing the pushed-and-sliding obstacle, the operation of bypassing the pushed-and-sliding obstacle by stopping and reversing the robot cleaner such that the pushed-and-sliding obstacle is no longer pushed may be performed (S90).

The pushed-and-sliding obstacle may be bypassed when it is determined four times in a row that the robot cleaner has encountered the pushed-and-sliding obstacle. Because the controller performs the determinations tens or hundreds of times per second, the controller may perform a plurality of determinations in a short time. Therefore, the wheel driving motor 400 may be driven such that the controller performs the bypass only in situations where reliability is high. In this connection, the robot cleaner may clean a region where the pushed-and-sliding obstacle is not located after reversing from the pushed-and-sliding obstacle. In this case, a region where the pushed-and-sliding obstacle is located may be sensed by various sensing units such as the imaging means.

The controller 300 may register the pushed-and-sliding obstacle on the saved map. An obstacle location may be registered on the map that is stored in the robot cleaner or stored externally and referenced by the robot cleaner, so that re-visiting or re-contacting pushed-and-sliding obstacle may be prevented when the robot cleaner moves to the same location. Specifically, the obstacle location may be registered on three maps (an around map, a grid map, and a learning map). In this connection, the obstacle location may be registered on the map based on a front width of the robot in order to minimize an influence by size. In one example, only a face of the obstacle where pushing occurs may be registered on the map because a size of the obstacle is ununiform. Further, when the robot cleaner encounters the pushed-and-sliding obstacle again at the other side of the pushed-and-sliding obstacle, the pushing also occurs at the other side of the pushed-and-sliding obstacle. Therefore, the size of the pushed-and-sliding obstacle may be accurately registered on the map.

Figure 5:
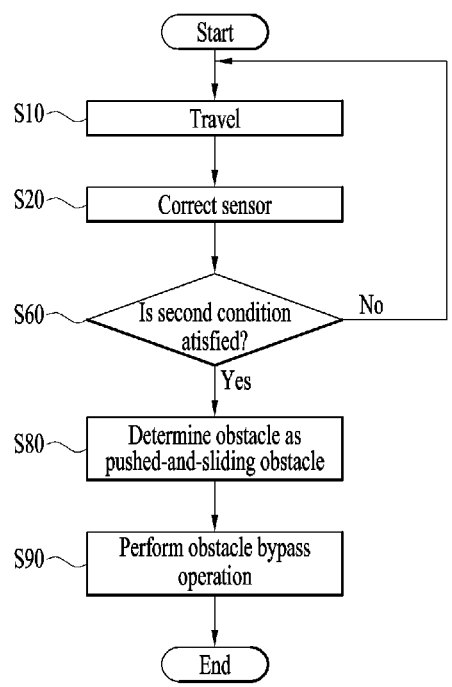
FIG. 5 is a control flow diagram according to another embodiment.

FIG. 5 is a control flow diagram according to another embodiment. In another embodiment according to FIG. 5, unlike the embodiment according to FIG. 3, the determination on the first condition is excluded. Even when the first condition is not satisfied, the controller may determine whether the robot cleaner has encountered the pushed-and-sliding obstacle by only determining whether the second condition is satisfied. Because other contents are the same as one embodiment, a description of overlapping contents will be omitted.

The present disclosure is not limited to the above-described embodiment. As may be seen from the appended claims, modifications may be made by those skilled in the art to which the present disclosure belongs, and such modifications are within the scope of the present disclosure. The present disclosure is to solve the above problems, which is to provide a robot cleaner that may determine a pushed-but-fixed obstacle and a pushed-and-sliding obstacle in a manner of distinguishing the pushed-but-fixed obstacle and the pushed-and-sliding obstacle from each other, and a method for controlling the same. Further, the present disclosure is to provide a robot cleaner that may prevent an obstacle from being pushed and perform a bypass operation when the obstacle is determined to be a pushed-and-sliding obstacle, and a method for controlling the same.

The present disclosure relates to a method for recognizing a pushed-and-sliding obstacle that is difficult for a robot cleaner to recognize using various sensors mounted on the robot cleaner. When recognizing an obstacle, a process of determining whether the obstacle is currently being pushed may be performed using a machine learning (deep learning) technique utilizing multiple sensor data acquired in real time while the robot cleaner is operating. Because sensor information may change instantaneously or different result values may be obtained based on a floor material, the sensor data is pre-processed. In addition, in order to prevent misrecognition, a recognition function is not performed while an operation such as rotation/lift/tilt is performed.

Further, whether the robot cleaner is in contact with the obstacle may be pre-determined using the sensors, and then a type of the obstacle may be recognized when it is determined that the robot cleaner is in contact with the obstacle. When it is determined that the robot cleaner is pushing the obstacle, a bypass motion may be performed to avoid such situation, and an obstacle location may be registered on a cleaning map to prevent the robot cleaner from re-visiting the corresponding location or re-contacting the obstacle.

The present disclosure provides a robot cleaner that senses a pushed-and-sliding obstacle using various sensors and a method for controlling the same. Further, the present disclosure provides a robot cleaner that may recognize a property of an obstacle and a state of a floor and perform the recognition using a machine learning (deep learning) method, and a method for controlling the same. Further, the present disclosure may provide a robot cleaner that may recognize a state of a floor for sensor value correction, may mark an obstacle property on a map to bypass a corresponding region later, and may apply a trigger algorithm for preventing misrecognition, and a method for controlling the same.

The present disclosure may perform primary filtering on data that determines whether an obstacle is a pushed-and-sliding obstacle by setting a trigger condition for operating pushed-and-sliding inhibition. Primarily, a light quantity and a height value of a cliff sensor may be referenced, and a wheel current value of a current sensor may be referenced when the light quantity and the height value of the cliff sensor are unclear. When a primary condition is satisfied continuously, it may be determined that whether the obstacle is the pushed-and-sliding obstacle using the machine running, and the obstacle may be bypassed.

One aspect of the present disclosure proposes a method for controlling a robot cleaner including a travel operation in which the robot cleaner travels, a recognition operation in which when the robot cleaner contacts an obstacle during the travel, the robot cleaner determines whether the obstacle is pushed by the robot cleaner and slides, and an obstacle bypass operation in which upon determination that the obstacle is the pushed-and-sliding obstacle, the robot cleaner stops the travel and then bypasses the pushed-and-sliding obstacle.

In one implementation, the travel operation may include an operation in which the robot cleaner moves on a floor face, and an operation of correcting a sensing unit. In one implementation, the recognition operation may include an operation of determining whether a first condition is satisfied, and the first condition may be a condition excluding a case in which the obstacle is misrecognized as the pushed-and-sliding obstacle.

In one implementation, the first condition may not correspond to a case in which the robot cleaner is rotated, is lifted, travels on a carpet, is tilted, or a wall is sensed. In one implementation, the recognition operation may include an operation of determining whether a second condition is satisfied, and wherein the second condition may correspond to a case in which a current resistance of a wheel driving motor recognized by a current sensor changes.

In one implementation, the recognition operation may include an operation of determining whether a second condition is satisfied, and wherein the second condition may correspond to a case in which a height value measured by a cliff sensor changes. In one implementation, the recognition operation may include an operation of determining whether a second condition is satisfied, and wherein the second condition may correspond to a case in which a quantity of light received by a cliff sensor changes.

In one implementation, the recognition operation may include an operation of recognizing that the robot cleaner is in contact with the pushed-and-sliding obstacle when data in which a current resistance of a wheel driving motor recognized by a current sensor, a height value measured by a cliff sensor, and a quantity of light received by the cliff sensor satisfies a condition of determining the obstacle as the pushed-and-sliding obstacle.

In one implementation, the obstacle bypass operation may include an operation of bypassing the pushed-and-sliding obstacle by stopping and reversing the robot cleaner such that the pushed-and-sliding obstacle is no longer pushed by the robot cleaner. In one implementation, the obstacle bypass operation may include an operation of registering the pushed-and-sliding obstacle on a stored map.

Another aspect of the present disclosure proposes a robot cleaner including a traveling body, a sensing unit disposed on the body and recognizing external information, and a controller that determines an obstacle as a pushed-and-sliding obstacle based on information recognized by the sensing unit, wherein the sensing unit includes a current sensor for measuring a current resistance of a driving motor, and a cliff sensor for measuring a height variation and a quantity of light reflected from a floor.

In one implementation, the controller may determine that the pushed-and-sliding obstacle is not pushed when one of cases in which the body is rotated, is lifted, travels on a carpet, is tilted, and a wall is sensed occurs. In one implementation, the controller may determine that the body is pushing the pushed-and-sliding obstacle when the information measured by the sensing unit changes.

In one implementation, the controller may determine that the robot cleaner is in contact with the pushed-and-sliding obstacle when data sensed by the sensing unit and processed satisfies a condition of determining the obstacle as the pushed-and-sliding obstacle. In one implementation, the controller may stop and reverse the body such that the body bypasses the pushed-and-sliding obstacle, or register the pushed-and-sliding obstacle on a stored map when it is determined that the body is pushing the pushed-and-sliding obstacle.

According to the present disclosure, the pushed-and-sliding obstacle may be recognized during the travel of the robot cleaner, thereby preventing a dangerous situation in advance. That is, surroundings may be prevented from being messed after the cleaning is completed as a foot mat and the like are moved by the robot cleaner.

Properties of a floor and a floor obstacle may be recorded on a map, so that the cleaning may be performed by bypassing a dangerous region during future cleaning, thereby preventing a constrained situation in advance. Moreover, there is an advantage of not having to pre-clean (clear a space in advance to operate the robot cleaner).

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a robot, the method comprising:
   driving a motor of the robot to cause the robot to travel along a movement path;
   monitoring a load of the motor while the robot travels along the movement path;
   controlling the motor to selectively change the movement path when the load of the motor changes based on the robot moving an object while the robot is traveling along the movement path,
   monitoring at least one of a distance between a floor and the robot, or an amount of light reflected from the floor while the robot travels; and
   determining that the change in the load of the motor corresponds to the robot moving the object when the at least one of the distance between the floor and the robot, or the amount of light reflected from the floor indicate that robot is not being rotated or lifted, is not traveling on a carpet, is not being tilted, or is not contacting a wall or other immovable obstacle.

2. The method of claim 1, wherein the motor is controlled to change the movement path when a change in the load of the motor increases in response to the robot moving the object.

3. The method of claim 1, wherein controlling the motor to selectively change the movement path includes changing the movement path to bypass the object.

* * * * *